United States Patent
Dahrouj et al.

(10) Patent No.: US 9,253,740 B2
(45) Date of Patent: Feb. 2, 2016

(54) METHOD AND APPARATUS FOR COORDINATED POWER-ZONE-ASSIGNMENT IN WIRELESS BACKHAUL NETWORKS

(71) Applicant: BLiNQ Wireless Inc., Ottawa (CA)

(72) Inventors: Hayssam Dahrouj, Toronto (CA); Wei Yu, Toronto (CA); Taiwen Tang, Ottawa (CA); Jerry Chow, San Diego, CA (US); Radu Selea, Vaughan (CA)

(73) Assignee: BLiNQ Wireless Inc., Ottawa (CA)

( * ) Notice: Subject to any disclaimer, the term of this patent is extended or adjusted under 35 U.S.C. 154(b) by 133 days.

(21) Appl. No.: 14/093,011

(22) Filed: Nov. 28, 2013

(65) Prior Publication Data

US 2014/0148184 A1    May 29, 2014

Related U.S. Application Data

(60) Provisional application No. 61/731,429, filed on Nov. 29, 2012, provisional application No. 61/793,551, filed on Mar. 15, 2013.

(51) Int. Cl.
*H04W 72/04* (2009.01)
*H04W 52/34* (2009.01)

(52) U.S. Cl.
CPC .................... *H04W 52/346* (2013.01)

(58) Field of Classification Search
CPC ............. H04W 52/346; H04W 52/00; H04W 52/0216
USPC ....................... 455/452.1; 370/254
See application file for complete search history.

(56) References Cited

U.S. PATENT DOCUMENTS

| 5,956,642 | A | 9/1999 | Larsson et al. |
| 7,729,257 | B2 | 6/2010 | Kodialam et al. |

(Continued)

FOREIGN PATENT DOCUMENTS

| CA | 2809721 | 3/2012 |
| WO | 96/31009 | 10/1996 |

(Continued)

OTHER PUBLICATIONS

S. G. Kiani and D. Gesbert, entitled "Optimal and Distributed Scheduling for Multicell Capacity Maximization" IEEE Trans. Wireless Commun., vol. 7, No. 1, pp. 288-297, Jan. 2008.

(Continued)

*Primary Examiner* — Marisol Figueroa
*Assistant Examiner* — Jean Chang
(74) *Attorney, Agent, or Firm* — Ridout & Maybee LLP

(57) ABSTRACT

Methods are disclosed for scheduling resources in a wireless backhaul network comprising a plurality of N Hubs, each Hub serving a plurality of K Remote Backhaul Modules (RBMs), using a coordinated power zone assignment across the backhaul network. For each Hub, a one-to-one power zone assignment, of each of the K RBM to one of the K power zones, is computed by maximizing a selected network utility across the backhaul network. Coordinated power zone assignment according to preferred embodiments based on the auction approach offers a close-to-global-optimal solution. Coordinated scheduling based on first assigning RBMs to hubs heuristically, and then optimally scheduling RBMs within each hub also offers significant performance improvement as compared to non-coordinated systems. Preferred embodiments offer a significant performance improvement as compared to conventional systems. They are low in complexity, and compatible with the physical constraints of SFR-based wireless backhaul network, which make them amenable to practical implementation.

28 Claims, 5 Drawing Sheets

(56) References Cited

U.S. PATENT DOCUMENTS

| | | | |
|---|---|---|---|
| 7,826,417 | B2 | 11/2010 | Yang et al. |
| 2004/0087327 | A1 | 5/2004 | Guo |
| 2008/0101307 | A1* | 5/2008 | Sindhushayana et al. .... 370/337 |
| 2009/0197603 | A1 | 8/2009 | Ji et al. |
| 2010/0009748 | A1 | 1/2010 | Timperley |
| 2010/0087149 | A1 | 4/2010 | Srinivasan et al. |
| 2010/0097948 | A1 | 4/2010 | Barberis |
| 2010/0159841 | A1 | 6/2010 | Barberis et al. |
| 2011/0002285 | A1* | 1/2011 | Kim et al. ............. 370/329 |
| 2011/0222455 | A1 | 9/2011 | Hou et al. |
| 2012/0008569 | A1* | 1/2012 | Vrzic et al. ............ 370/329 |
| 2012/0082061 | A1* | 4/2012 | Lysejko et al. ............. 370/254 |
| 2012/0133557 | A1 | 5/2012 | Beaudin |
| 2012/0225662 | A1* | 9/2012 | Jo et al. ............... 455/447 |
| 2012/0236731 | A1 | 9/2012 | Beaudin |
| 2012/0281648 | A1 | 11/2012 | Dahrouj et al. |

FOREIGN PATENT DOCUMENTS

| | | |
|---|---|---|
| WO | 2005/101882 | 10/2005 |
| WO | 2008/033369 | 3/2008 |
| WO | 2008/096383 | 8/2008 |
| WO | 2009/066936 | 5/2009 |
| WO | 2009/119463 | 10/2009 |
| WO | 2010/003509 | 1/2010 |
| WO | 2010/013245 | 2/2010 |
| WO | 2011/037319 | 3/2011 |
| WO | 2012/037643 | 6/2012 |
| WO | 2013/000068 | 1/2013 |

OTHER PUBLICATIONS

L. Venturino, N. Prasad, and X. Wang, entitled "Coordinated Scheduling and Power Allocation in Downlink Multicell OFDMA Networks," IEEE Trans. Veh. Technol , vol. 6, No. 58, pp. 2835-2848, Jul. 2009.

A. L. Stolyar and H. Viswanathan, entitled "Self-Organizing Dynamic Fractional Frequency Reuse For Best-Effort Traffic Through Distributed Intercell Coordination," in INFOCOM, Apr. 2009.

M. X. Gong, et al., "Load- and interference-Aware Channel Assignment for Dual-Radio Mesh Backhauls", 2008 IEEE Global Telecommunications Conference (IEEE GLOBECOM 2008), pp. 1-6, Nov. 30-Dec. 4, 2008.

H. Dahrouj, W. Yu, T. Tang, J. Chow and R. Selea, "Coordinated scheduling for wireless backhaul networks with soft frequency reuse", in 21st European Signal Processing Conference (EUSIPCO), Marrakech, Morocco, Sep. 2013 (invited paper).

H. Dahrouj et al. "Interference Mitigation Via Power Control Under the One-Power-Zone-Constraint", IEEE Global Telecommun. Conf. (Globecom), Anaheim, CA, USA, Dec. 2012.

D. P. Bertsekas, in "The auction algorithm: A distributed relaxation method for the assignment problem," Annals of Operations Research, vol. 14, pp. 105-123, Dec. 1988.

\* cited by examiner

FRAME STRUCTURE AND POWER CONFIGURATION
OF THREE HUBS $i$, $l$, AND $m$.

| CELLULAR LAYOUT | HEXAGONAL |
|---|---|
| NUMBER OF HUBS | 21 |
| FREQUENCY REUSE BETWEEN SECTORS | 1 |
| NUMBER OF RBMs PER HUB | 4 |
| NUMBER OF ZONES PER FRAME | 4 |
| SCHEDULING | OUTPUT |
| CENTER-TO-CENTER DISTANCE | 800m |
| HUB-TO-RBM DISTANCE | RANDOM |
| SINR GAP | 12 dB |
| PATH LOSS MODEL | SUI-3 |
| HUB HEIGHT | 20 METERS |
| RBM HEIGHT | 10 METERS |
| CHANNEL ESTIMATION | PERFECT |
| SAMPLING FREQUENCY | $30.72 \times 10^6$ Hz |

SYSTEM PARAMETERS

FIG. 3

METHOD AND APPARATUS FOR COORDINATED POWER-ZONE-ASSIGNMENT IN WIRELESS BACKHAUL NETWORKS

CROSS-REFERENCE TO RELATED APPLICATIONS

This application claims priority from U.S. provisional patent application No. 61/731,429, filed Nov. 29, 2012, and U.S. provisional patent application No. 61/793,551, filed Mar. 15, 2013, both entitled "Method and Apparatus for Coordinated Power-Zone-Assignment in Wireless Backhaul Networks", which are incorporated herein by reference in their entirety.

TECHNICAL FIELD

This invention relates to wireless backhaul for high capacity data networks, to systems and methods for power-zone-assignment in wireless backhaul networks, and more particularly to practical techniques for maximizing a network utility for wireless backhaul networks, including MicroCell and PicoCell networks.

BACKGROUND

Coordinated resource allocation is expected to play a major role in improving the performance of densely deployed interference-limited networks, where coordination can offer significant advantages in mitigating wireless interference. Soft Frequency Reuse (SFR), in particular, is one enhanced frequency-reuse technique proposed for LTE-based systems. SFR provides both the flexibility of utilizing the available bandwidth, and the capability to reduce high inter-site interference levels associated with dense networks with aggressive frequency reuse.

Power-zone assignment is innately similar to the conventional scheduling, which has been well-studied in the literature of wireless networks. One of the most prominent solutions is the classical proportional fair scheduling solution, whose goal is to maximize the log of the long-term average rate. See for example, U.S. patent application Ser. No. 13/463,47, filed on 3 May 2012, by H. Dahrouj, W. Yu, T. Tang, and S. Beaudin, entitled "Interference Mitigation With Scheduling And Dynamic Power Spectrum Allocation For Wireless Networks". Such as solution, however, is based on a pre-assigned association of hubs and Remote Backhaul Modules (RBMs), and is performed on a per hub basis with no hub coordination. Such an approach does not guarantee an optimal solution to the problem, may depend on the ever-changing traffic of the wireless channel, and does not guarantee a one-to-one mapping constraint.

Thus, there is need for a method for scheduling resources in a backhaul network, e.g. for interference management, comprising power zone assignment, and in particular there is a need for practical methods using techniques with low complexity, fast convergence, and performance improvement as compared to conventional approaches.

The present invention seeks to mitigate one or more disadvantages of these known systems and methods, or at least provide an alternative.

SUMMARY OF INVENTION

Aspects of the present invention provide methods, systems, apparatuses and software products for scheduling resources in a wireless backhaul network comprising coordinated power zone assignment, achieved by maximizing a network utility across the network, and preferably optimally assigning RBMs to power-zones on a one-to-one basis.

A first aspect of the invention provides a method for scheduling resources in a wireless backhaul network comprising a plurality of N Hubs, each Hub serving a plurality of K Remote Backhaul Modules (RBMs), the method comprising: providing a power allocation of K power zones per Hub; selecting a network utility to be optimized across the backhaul network; based on measurements of channel gains for each Hub-RBM link, performing a coordinated power zone assignment across the backhaul network, comprising computing a one-to-one power zone assignment of each of the NK RBMs to one of the NK power zones by maximizing the selected network utility across the backhaul network.

Other aspects of the invention provide an apparatus, software, and a system for performing the methods described herein, as defined in claims. Thus, aspects of the present invention provide more efficient power-zone-assignment techniques which can be applied to wireless backhaul networks.

Embodiments of the method are applicable to a backhaul network comprising several hubs, each serving several Remote Backhaul Modules (RBMs). Influenced by the idea of Soft-Frequency-Reuse (SFR) recently developed for LTE-systems, the design strategy is based on a 3-sector model with frequency reuse 1 between the sectors. The backhaul network may preferably be a SFR-based backhaul network. SFR is introduced to increase the network capacity for areas with dense data traffic, and comprised of N hubs, where each hub can serve up to K Remote Backhaul Modules (RBMs) multiplexed across the K time/frequency zones, for a total number of NK RBMs and NK time/frequency zones, known as power-zones. Each of the power-zone operates at a pre-assigned power allocation. The performance of the system, therefore, widely depends on the optimal RBM-to-power-zone assignment, i.e. finding the optimal assignment that associates each of the KN RBMs with one of the KN available power-zones, on a one-to-one mapping basis.

The power-zone-assignment problem is considered from a generic network utility perspective. It considers the problem of maximizing a network utility function across the whole network, where the maximization is over the possible RBM-to-power-zone assignments on a one-to-one basis. Practical methods are provided to solve the problem.

In a method of one embodiment, called Auction-Based Power-Zone Assignment solution, (AB-PZA), the method is based on the auction approach, first proposed by D. P. Bertsekas in "The auction algorithm: A distributed relaxation method for the assignment problem," Annals of Operations Research, vol. 14, pp. 105-123, December 1988. The AB-PZA method inherits the advantages of the auction approach. It, especially, offers close-to-global optimal solution to the problem. Furthermore, it can be implemented in a distributed fashion across all hubs, and asynchronously at each hub.

Methods according to other embodiments are based on simple heuristic methods which offer a decent performance improvement as compared to non-coordinated conventional systems. These methods are low in complexity, fast in convergence, and compatible with the physical constraints of SFR-based wireless backhaul system.

In particular, inspired by the advantages of Soft-Frequency-Reuse techniques of LTE-systems, methods according to preferred embodiments are based on a 3-sector SFR-based wireless backhaul network, with frequency reuse 1 between the sectors. For example, a backhaul network providing increased network capacity for areas with dense data traffic, comprises N transmitters known as hubs, serving KN Remote Backhaul Modules (RBMs) in total, where K is the number of frequency/time zones of every hub frame. Each of the zones, called power-zones, operates at a pre-assigned power allocation. The performance of the system, therefore, widely depends on the optimal RBM-to-power-zone assignment strategy, i.e. the resource allocation problem of optimally scheduling each of the NK RBMs to one of the NK power-zones, on a one-to-one basis, and in a coordinated manner, as opposed to conventional systems which schedule the RBMs entering the network in an uncoordinated way. Thus the present invention provides a method comprising coordinated power-zone-assignment for wireless backhaul networks. It considers the problem of maximizing a network utility function across the whole network, where the maximization is over all possible RBM-to-power-zone assignments.

A method according to one embodiment, called Auction-Based Power-Zone Assignment solution, (AB-PZA) is based on an auction approach, and innately inherits its advantages. AB-PZA, especially, offers a close-to-global optimal solution. It can be implemented in a distributed fashion across all hubs, and asynchronously at each hub. Another proposed embodiment of the method, although suboptimal, is referred to as a Clustering-and-Exhaustive-Search Power-Zone-Assignment (CES-PZA) method. This method first assigns each RBM to one hub, utilizing a maximum rate-based clustering. The RBM-to-power-zone assignment problem then reduces to a low complexity exhaustive search, which can be performed on a per-hub basis. Embodiments of the methods disclosed in this application offer a performance improvement as compared to uncoordinated conventional systems. Both AB-PZA and CES-PZA are practical methods, and compatible with the physical constraints of SFR-based wireless backhaul systems, which make them amenable to practical implementation.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF THE DRAWINGS

FIG. 3 shows a table that summarizes the system parameters of a wireless backhaul network used for simulations to evaluate the performance of methods according to embodiments of the invention;

DETAILED DESCRIPTION OF EMBODIMENTS

Figure 1:
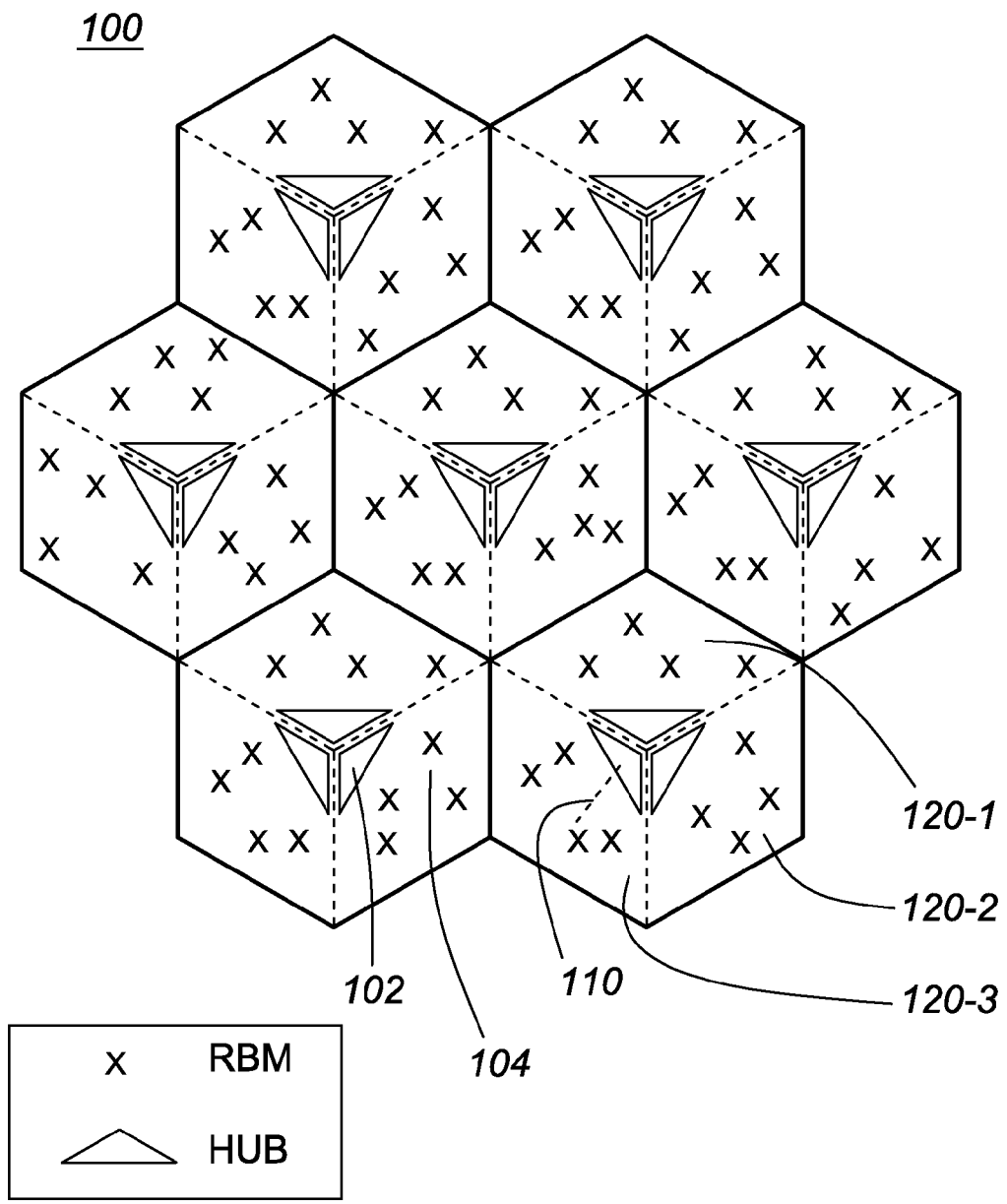
FIG. 1 shows a schematic diagram of an exemplary wireless backhaul network comprising seven cells, 3 sectors per cell, 1 hub per sector, and 4 Remote Backhaul Modules (RBMs) per sector.

FIG. 1 shows a schematic diagram of an exemplary wireless backhaul network 100 comprising seven cells, with three sectors per cell (i.e. sectors 120-1, 120-2 and 120-3), one hub 102 per sector, and four Remote Backhaul Modules (RBMs) 104 per sector. Thus, in general, the system model is that of a wireless backhaul network comprising N hubs, each serving K RBMs, for KN RBMs in total.

Figure 2:
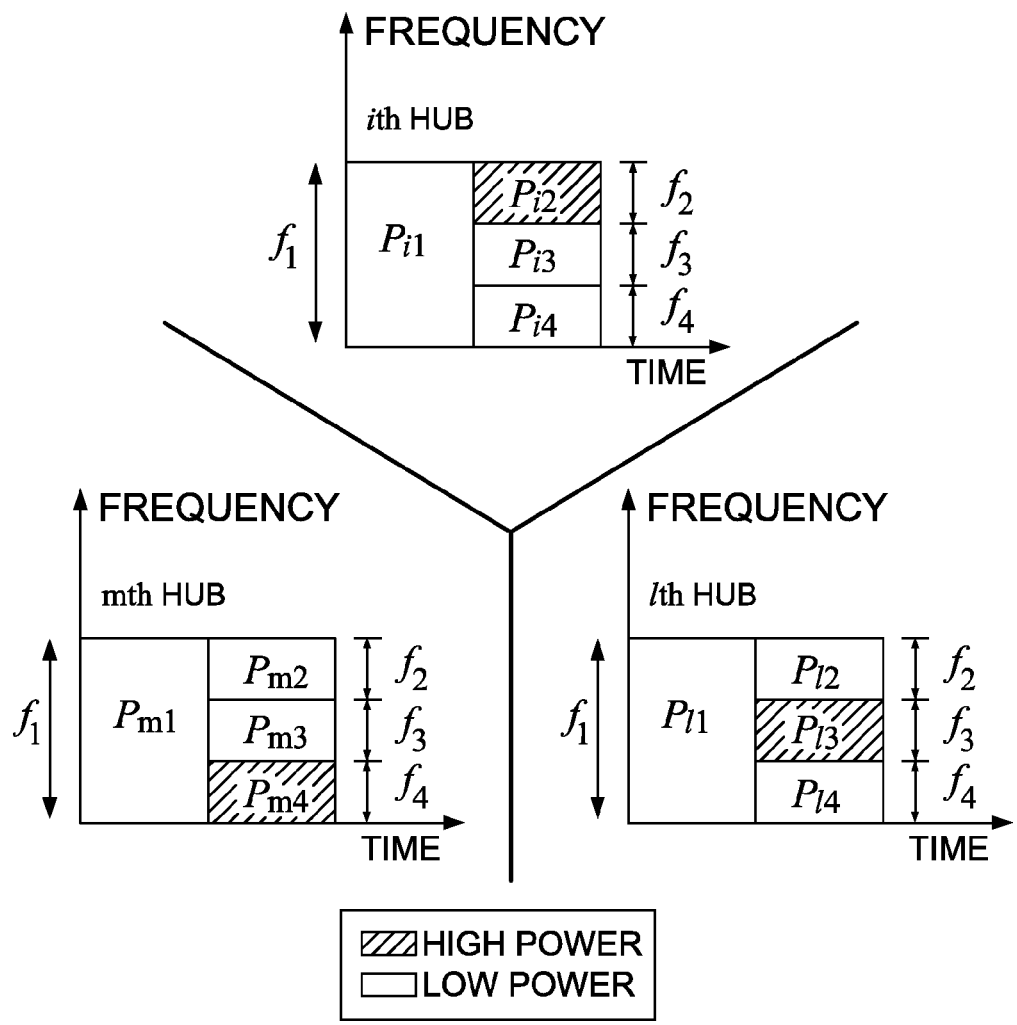
FIG. 2 illustrates schematically the transmitted frames of 3 interfering hubs, showing the structure and power configuration of each frame.

FIG. 2 shows an example of an SFR-based framing structure of three interfering hubs. The bandwidth $f_1$ of each hub transmission is divided into three orthogonal segments $f_2$, $f_3$, and $f_4$. The transmit frame structure of every hub comprises two time zones. The first time zone contains the data associated with one RBM, and utilizes the entire bandwidth. The second time zone contains the data for the other three RBMs, which are separated from each other in frequency, using different RBM-to-subband assignments. Each of the subband zones, called power-zones, operates at a pre-assigned power allocation. The performance of the system, therefore, widely depends on the optimal RBM-to-power-zone assignment.

The objective of methods according to embodiments of the invention is to maximize a network utility function across the whole wireless backhaul network, where the maximization is over the possible RBM-to-power-zone assignments on a one-to-one basis. More specifically, let (i, j) be the jth power-zone of the ith hub, and $a_{ik}^j$ the utility of assigning the $RBM_i$ to power-zone (i, j), given all the KN available power-zones. Also let H be the set of hubs, Z the set of power-zones for every hub. The maximization problem then becomes:

$$\max \sum_{i,j,k} a_{ik}^j x_{ik}^j$$

$$\text{s.t.} \sum_k x_{ik}^j = 1, (i, j) \in H \times Z$$

$$\sum_{(i,j) \in H \times Z} x_{ik}^j = 1, x_{ik}^j \in \{0, 1\}$$

where the above maximization is over the discrete binary variable $x_{ik}^j$, which is 1 if RBM k is mapped to power-zone (i, j), and zero otherwise.

The problem as formulated above corresponds to a one-to-one assignment problem.

In a method according to a first embodiment of the invention an auction-based method is proposed to solve the problem. The method, called auction-based power-zone-assignment (AB-PZA) method, offers a close-to-global optimal solution, i.e. within ϵ of the global optimal solution. The auction approach was first proposed for the classical object-to-person assignment problem by D. P. Bertsekas, in "The auction algorithm: A distributed relaxation method for the assignment problem," Annals of Operations Research, vol. 14, pp. 105-123, December 1988.

To establish a social optimum among all RBMs and power-zones, AB-PZA proceeds in rounds (or iterations) to update the assignment and prices, i.e. the bidder RBM i raises the price of its preferred power zone j by some bidding increment. Bidding increments and price increases help competition by making the RBM bidder's own preferred power-zone less attractive to other potential RBMs.

AB-PZA method can be summarized as follows:

Initialize a positive scalar ϵ>0, introduced to guarantee the algorithm convergence.

Start with an empty set of power-zone-assignment mappings, and a set of prices $\lambda_i^j$ satisfying the ϵ-complementary slackness condition:

$\max_{(l,m)}\{a_{lk}^m - \lambda_l^m\} - \epsilon \leq a_{ik}^j - \lambda_i^j$.

1) Bidding phase:
   a) For each unassigned RBM k, find the power-zone $(i_k, j_k)$ that maximizes the profit of RBM k, i.e.: $(i_k, j_k) = \text{argmax}_{(i,j)} \{a_{ik}^j - \lambda_i^j\}$.
   b) Compute $b_k$, defined as the best value offered by power-zone other than $(i_k, j_k)$, i.e., $b_k = \max_{(i,j) \neq (i_k, j_k)} \{a_{ik}^j - \lambda_i^j\}$.
   c) Compute $\beta_{i_k,k}^{j_k}$, defined as the bid of RBM k for power-zone $(i_k, j_k)$: $\beta_{i_k,k}^{j_k} = a_{i_k,k}^{j_k} - b_k + \epsilon$.
   d) Go to step 1(a); repeat for all unassigned RBMs.
2) Assignment phase:
   a) For each power-zone $(i,j)$, find the RBM $k_i^j$ that offers the highest bid to $(i,j)$, as found in step 1 above, i.e., $k_i^j = \text{argmax}_k \beta_{ik}^j$.
   b) Assign $(i,j)$ to RBM $k_i^j$, and set $(i,j)$'s price to this highest bid, i.e., $$\lambda_i^j = \beta_{ik_i^j}^j.$$

c) Go to step 2) a.; and repeat for all $(i,j)$.
3) Set $\epsilon = \alpha \epsilon$ for some $0 < \alpha < 1$; go to step 1(a); and stop when $$\epsilon < \frac{1}{NK}.$$

The AB-PZA method inherits the advantages of the auction approach. It offers an £ close-to-global optimal solution to the problem. It can be implemented in distributed fashion across all hubs, and asynchronously at each hub.

The AB-PZA method enables jointly and globally determining both the RBM-to-power-zone assignment and the RBM-to-hub association. The latter is also known as clustering.

For systems with a prior knowledge of the clustering strategy, the problem reduces to a RBM-to-power-zone assignment problem, on a per-hub basis. The latter is especially applicable for the downlink of the system under consideration. Thus, based on this observation, a method according to another embodiment is proposed, called a Clustering-and-Exhaustive-Search Power-Zone-Assignment method (CES-PZA). This method hinges upon the fact that, for clustering in the downlink direction, the assignment decision of every RBM belonging to a certain hub to some power-zone does not affect the assignment of RBMs belonging to other hubs. Given that only K RBMs would roam to every hub, it is sufficient for every hub to look over the K! possibilities of its own RBM-to-power-zone assignment. CES-PZA, therefore, first decides the clustering strategy based on one of the power-zones and one hub. Subsequently, CES-PZA evokes an exhaustive search of RBM-to-power-zone assignments, on a per hub basis. CES-PZA is a simple method based on the gains $a_{ik}^j$. It has low computational complexity, and already brings in a significant performance improvement as compared to conventional systems, as the simulation results presented herein suggest.

More specifically, let A be the NK×NK matrix whose entries are defined as follows:

$$A_{k,(i-1)K+j} = a_{ik}^j.$$

At each step, find the largest entry of the matrix A, call it $$A_{k_x^{max}, k_y^{max}}.$$

RBM $k_x^{max}$ them maps to power-zone $$(i_{k_x^{max}}, j_{k_x^{max}}),$$

wherein:

$$i_{k_x^{max}} = \left\lfloor \frac{k_y^{max} - 1}{K} \right\rfloor + 1, \quad j_{k_x^{max}} = \text{mod}(k_y^{max} - 1, K) + 1,$$

where $\lfloor \; \rfloor$ and mod(,) represent the floor and modulo operators, respectively. Next, delete the $$A_{k_x^{max}}$$

th row and the $$A_{k_y^{max}}$$

th column of the matrix A, so that $$A_{k_x^{max}}$$

and power zone $$A_{k_y^{max}}$$

are not involved in subsequent steps. Repeats this procedure until all the KN RBMs are divided into disjoint clusters of equal cardinality K.

The above step is followed by an exhaustive search on per-hub basis to rearrange the RBMs within each hub frame.

The clustering part of the method of this embodiment requires a central processor which has access to all entries of the matrix A, and therefore has the power of assigning RBMs in a coordinated way. In conventional systems, however, networks are formed incrementally, i.e., RBMs enter the network, each one at a time. Whenever a RBM k enters the network, it only has information about its own individual utilities $a_{ik}^j$ for all $(i, j)$. An uncoordinated strategy to assign RBMs to power-zone (and equivalently to hubs) can then be summarized as follows:

1) Whenever a user k enters the network, consider row A(k,:) solely, and choose the index $k_y^{max}$ that corresponds to the maximum entry $$A_{k, k_y^{max}}.$$

2) Power-zone $k_y^{max}$ is reserved to RBM k and announced unavailable to all new comers (i.e., new RBMs).

3) Repeat the process for all new comers k'(k'≠k).

Because of the less coordinated nature of the incremental deployment, the additional per-hub exhaustive search step here brings in significant additional gain.

To compare the methods of the different embodiments proposed herein, we simulated the performance of the methods based on a wireless backhaul network, similar to the one shown in FIG. 1. System parameters for the simulations are shown in FIG. 3.

The utility function $a_{ik}^j$, used as an example in the simulations for illustration purposes, corresponds to the rate $a_{ik}^j = R_{ik}^j = W_{i,j} \log_2(1+SINR_{ik}^j)$ of RBM k if it is assigned to power-zone (i,j). The power is allocated based on SFR-systems strategy. It allows each sector to utilize the entire bandwidth, while reducing the interference to the neighboring sectors. It also allows the inner RBMs to use the outer sub-bands, as a way to improve the overall system throughput.

Figure 4:
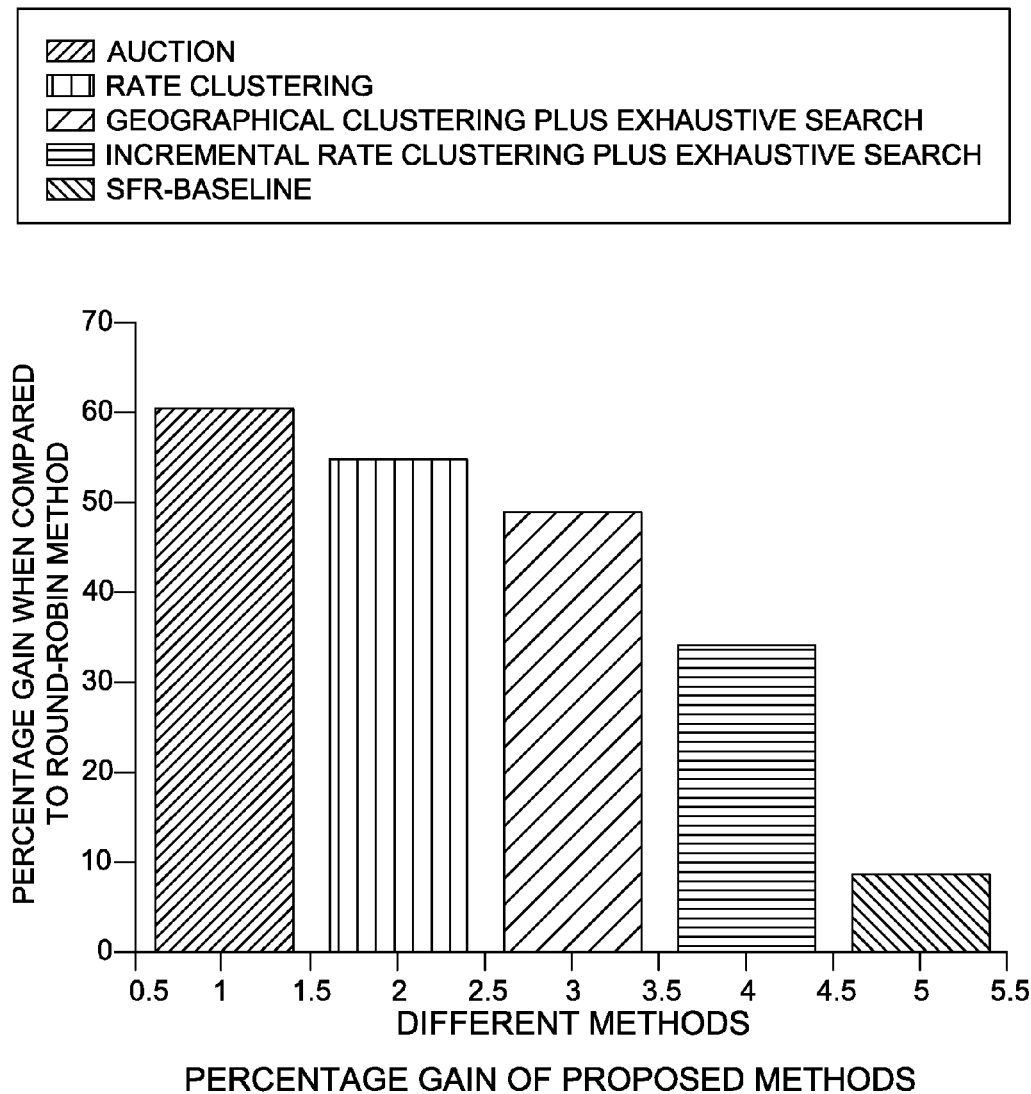
FIG. 4 is a bar chart showing the percentage gain of methods according to embodiments of the invention as compared to a conventional round-robin approach.

To show the gain of the coordinated scheduling methods, FIG. 4 shows the percentage gain in sum-rate for each the methods as compared to the simple round-robin assignment. As shown in FIG. 4, the auction algorithm, which offers a close-to-global-optimal solution provides the best performance among the proposed methods. The other simple heuristic rate-clustering method already shows a performance gain of within 6% of auction method. Most importantly, FIG. 4 especially shows the significant performance gain offered by coordinated power-zone-assignment methods, i.e. auction, rate-clustering and geographical-clustering-plus-exhaustive-search methods, when compared to the uncoordinated-rate-clustering-plus-exhaustive-search method. The auction method, in particular, offers up to 30% sum-rate improvement over uncoordinated systems.

Furthermore, FIG. 4 shows how all the proposed methods have a superior performance to a simple SFR-baseline method. Such a method does not account for the possible SINR values of different assignments. Instead, it simply assigns RBMs to power-zones based on local channel information.

Figure 5:
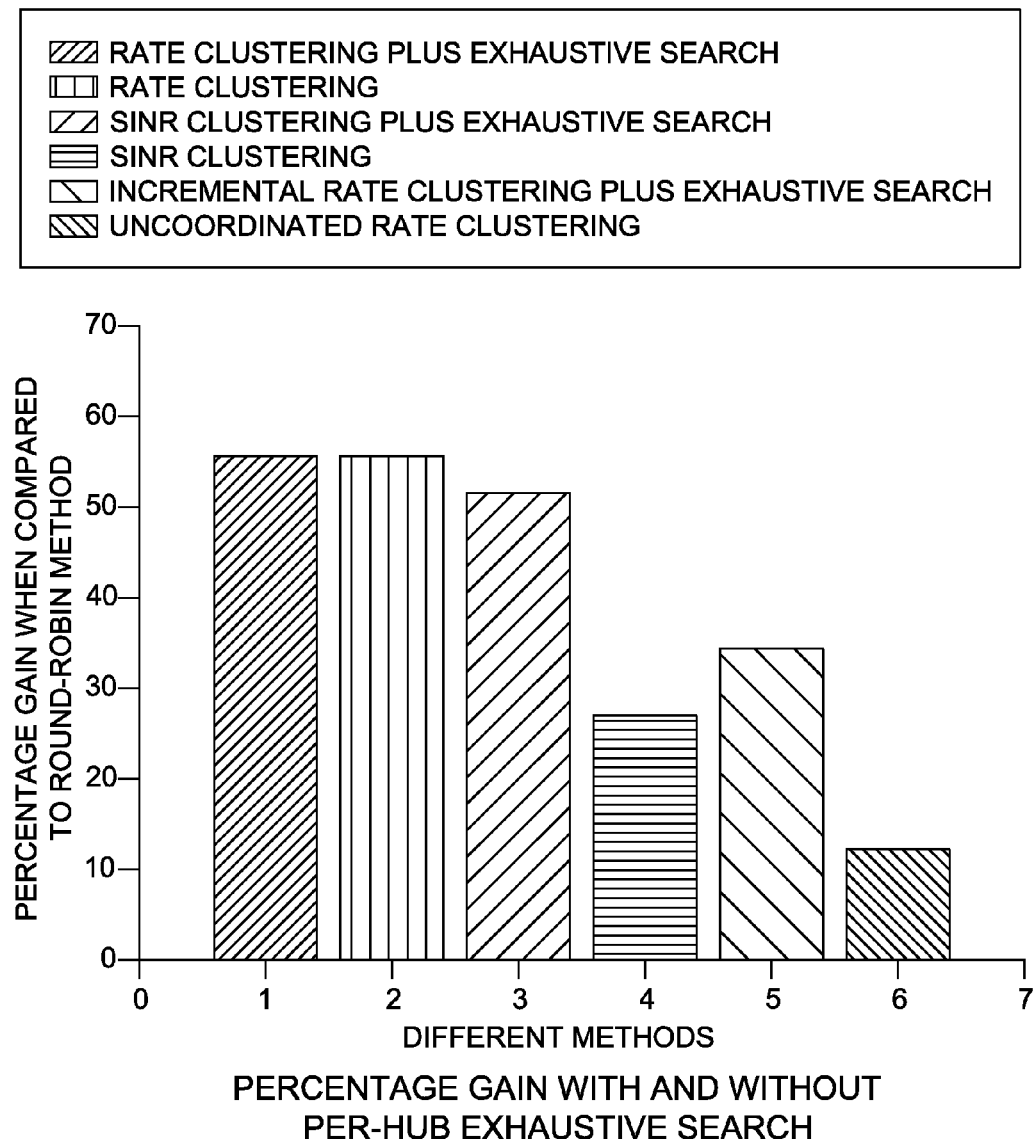
FIG. 5 is a bar chart showing the percentage gain using methods with and without a per-hub exhaustive search.

To show the individual gains provided by both the clustering and the per-hub exhaustive search steps, we show the percentage gain of the methods under different clustering strategies in FIG. 5. The first shows that the gain of the additional exhaustive search is negligible after rate-clustering. This is especially due to the fact that rate-clustering already accounts for the rates themselves. SINR-clustering, however, does not account for the bandwidths allocations of the different power-zones. Therefore, as expected, FIG. 5 shows that the additional per-hub exhaustive search succeeding the SINR-clustering brings in a significant additional gain. The same goes for the uncoordinated-rate-clustering, because of the uncoordinated nature of its incremental deployment.

In summary, Soft Frequency Reuse (SFR) is an enhanced frequency reuse technique, that provides both the flexibility of utilizing the entire available bandwidth, and the capability to reduce high inter-site interference levels, associated with networks with full frequency reuse. This application discloses and examines the benefits of one type of coordinated scheduling in Soft Frequency Reuse (SFR)-based systems. Considering, for example, the downlink of a 3-sector-per-cell SFR-based wireless backhaul network consisting of N access nodes (hubs), each serving K remote terminals (RBMs) multiplexed across the K time/frequency zones, with frequency reuse one between the sectors, and assuming a fixed transmit power, methods are disclosed to address the resource allocation problem of optimally scheduling each of the NK RBMs to one of the NK power-zones, on a one-to-one basis, and in a coordinated manner, as opposed to conventional systems which schedule the RBMs entering the network in an uncoordinated way. One of the embodiments is based on the auction approach, and offers a close-to-global-optimal solution. Other embodiments are based on first assigning RBMs to hubs heuristically, and then optimally scheduling RBMs within each hub. Simulation results show that coordinated scheduling offers significant performance improvement as compared to non-coordinated systems. The methods according to preferred embodiments offer a significant performance improvement as compared to conventional systems. These methods are low in complexity, and compatible with the physical constraints of SFR-based wireless systems. Thus, these methods are amenable to practical implementation. Methods according to embodiments of the invention described herein provide for interference management in wireless backhaul networks using coordinated power zone assignment. The methods disclosed herein are applicable to wireless backhaul networks comprising MicroCell and PicoCell networks, which involve a one-to-one power-zone-assignment problem. The auction-based power-zone-assignment (AB-PZA) method offers a close-to-global optimal solution. It can be implemented in a distributed fashion across all transmitters, and asynchronously at each transmitter. The Clustering-and-Exhaustive-Search Power-Zone-Assignment (CES-PZA) method is another simple method, which can be implemented on a per-hub-basis, given a pre-assigned clustering.

Both the AB-PZA and CES-PZA methods provide coordinated power-zone-assignment-methods across the entire backhaul network. These methods provide a significant performance improvement as compared to conventional non-coordinated systems, and can be implemented in a distributed fashion, and asynchronously across all hubs.

A related article authored by the inventors entitled "Coordinated Scheduling for Wireless Backhaul Networks with Soft Frequency Reuse", H. Dahrouj, W. Yu, T. Tang, J. Chow and R. Selea, 21st European Signal Processing Conference (EUSIPCO), Marrakech, Morocco, September 2013, is incorporated herein by reference in its entirety.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for scheduling resources in a wireless backhaul network comprising a plurality of N Hubs, each Hub serving a plurality of K Remote Backhaul Modules (RBMs), the method comprising:
   providing a power allocation of K power zones per Hub;
   selecting a network utility to be optimized across the backhaul network;
   based on measurements of channel gains for each Hub-RBM link, performing a coordinated power zone assignment across the backhaul network, comprising computing a one-to-one power zone assignment of each of the N×K (NK) RBMs to one of the NK power zones by maximizing the selected network utility across the backhaul network,
   wherein maximizing the selected network utility across the backhaul network is defined by:

$$\max \sum_{i,j,k} a_{ik}^j x_{ik}^j$$

$$\text{s.t.} \sum_k x_{ik}^j = 1, (i,j) \in H \times Z$$

$$\sum_{(i,j) \in H \times Z} x_{ik}^j = 1, x_{ik}^j \in \{0, 1\}$$

where
- (i, j) is the $j^{th}$ power-zone of the $i^{th}$ hub;
- $a_{ik}^j$ is an individual utility term;
- H is a set of the plurality of hubs $\{1, \ldots N\}$;
- Z is a set of power-zones $\{1, \ldots K\}$ for every hub; and
- $x_{ik}^j$ is a discrete binary variable.

2. The method of claim 1 wherein each power-zone corresponds to a frequency sub-band maintained at a particular level of transmit power.

3. The method of claim 1 wherein power-zone assignment comprises power-zone-assignment in the downlink.

4. The method of claim 1 wherein $x_{ik}^j$ is 1 if RBM k is mapped to power zone (i, j), and zero otherwise.

5. The method of claim 1 wherein the individual utility term $a_{ik}^j$ is defined as the utility of assigning the RBM k to power-zone (i, j), given all the NK available power-zones.

6. The method of claim 5 wherein the individual utility term $a_{ik}^j$ is set as the rate of the RBM k if it is mapped to power-zone (i, j).

7. The method of claim 5 wherein the individual utility term $a_{ik}^j$ is set as the log of the rate of the RBM k if it is mapped to power-zone (i, j).

8. The method of claim 1, wherein computing the one-to-one power-zone-assignment is based on the channel gains, the utility function and the power allocation, using an Auction-Based Power-Zone Assignment (AB-PZA) approach.

9. The method of claim 8 (AB-PZA), wherein the power-zone-assignment variable $x_{ik}^j$ is found using the auction approach to provide the one-to-one power zone assignment.

10. The method of claim 9, wherein a close-to-global-optimal solution is found iteratively using the following steps:
- initialize a positive scalar $\epsilon > 0$, introduced to guarantee the algorithm convergence;
- start with an empty set of power-zone-assignment mappings, and a set of prices $\lambda_i^j$ satisfying the $\epsilon$-complementary slackness condition:

$$\max_{(l,m)} \{a_{lk}^m - \lambda_l^m\} - \epsilon \leq a_{ik}^j - \lambda_i^j$$

1) bidding phase:
  a) for each unassigned RBM k, find the power-zone $(i_k, j_k)$ that maximizes the profit of RBM k, i.e.:
  $(i_k, j_k) = \text{argmax}_{(i,j)} \{a_{ik}^j - \lambda_i^j\}$,
  b) compute $b_k$, defined as the best value offered by power-zone other than $(i_k, j_k)$, i.e., $b_k = \max_{(i,j) \neq (i_k, j_k)} \{a_{ik}^j - \lambda_i^j\}$,
  c) compute $\beta_{i_k, k}^{j_k}$, defined as the bid of RBM k for power-zone $(i_k, j_k)$: $\beta_{i_k, k}^{j_k} = a_{i_k, k}^{j_k} - b_k + \epsilon$,
  d) go to step 1(a); repeat for all unassigned RBMs;

2) assignment phase:
  a) for each power-zone (i,j), find the RBM $k_i^j$ that offers the highest bid to (i,j), as found in step 1 above, i.e., $k_i^j = \text{argmax}_k \beta_{ik}^j$,
  b) assign (i,j) to RBM $k_i^j$, and set (i,j)'s price to this highest bid, i.e., $$\lambda_i^j = \beta_{ik_i^j}^j,$$

c) go to step 2) a.; and repeat for all (i,j);
3) set $\epsilon = \alpha \epsilon$ for some $0 < \alpha < 1$; go to step 1(a); and stop when $$\epsilon < \frac{1}{NK}.$$

11. The method of claim 10, wherein said steps to find the close-to-global-optimal solution are implemented asynchronously across the backhaul network.

12. The method of claim 10, wherein said steps to find the close-to-global-optimal solution are performed by Hubs distributed across the backhaul network.

13. The method of claim 1, wherein the power-zone-assignment solution is based on the channel gains, the utility function and the power allocation, using a Clustering-and-Exhaustive-Search Power-Zone-Assignment (CES-PZA) approach.

14. The method of claim 13 (CES-PZA), wherein the step of clustering comprises a coordinated approach wherein:
A is the NK×NK matrix whose entries are defined as follows: $A_{k,(i-1)K+j} = a_{ik}^j$
at each step, find the largest entry of the matrix A, call it $$A_{k_x^{max}, k_y^{max}}.$$

RBM $k_x^{max}$ then maps to power-zone $$(i_{k_x^{max}}, j_{k_x^{max}}),$$

where $$i_{k_x^{max}} = \left\lfloor \frac{k_y^{max} - 1}{K} \right\rfloor + 1, \; j_{k_x^{max}} = \text{mod}(k_y^{max} - 1, K) + 1,$$

where $\lfloor \; \rfloor$ and mod(,) represent the floor and modulo operators, respectively; next, delete the $A_{k_x^{max}}$th row and the $A_{k_y^{max}}$th column of the matrix A, so that $A_{k_x^{max}}$ and power zone $A_{k_y^{max}}$ are not involved in subsequent steps, and repeat this procedure until all the NK RBMs are divided into disjoint clusters of equal cardinality K.

15. The method of claim 13 (CES-PZA), wherein the step of clustering comprises a geographical mapping based on a shortest-distance criterion.

16. The method of claim 13 (CES-PZA), wherein the step of clustering comprises a mapping based on a maximum-rate mapping criterion.

17. The method of claim 13 (CES-PZA), wherein the step of clustering comprises a mapping based on a maximum signal-to-interference-plus-noise-ratio (SINR) criterion.

18. The method of claim 13 (CES-PZA), wherein the step of power-zone assignment is based on a fixed clustering of hubs and RBMs.

19. The method of claim 18, wherein the step of power-zone-assignment is performed on a per-hub-basis and maps each of the K RBMs served by that hub to one of the K power-zones of the Hub.

20. The method of claim 13, wherein the step of power-zone-assignment is performed on a per-hub basis, for each hub among the N hubs.

21. The method of claim 20, wherein the step of power-zone-assignment comprises performing an exhaustive search on a per-hub basis, by searching over the K! assignment possibilities and choosing the assignment with the highest per-hub utility, for every hub.

22. The method of claim 20, wherein the step of power-zone-assignment comprises performing an auction method on a per-hub basis.

23. The method of claim 13, wherein the step of clustering is found using the following incremental approach wherein:

A is the NK×NK matrix whose entries are defined as follows: $A_{k,(i-1)K+j} = a_{ik}^j$,
1) whenever a user k enters the network, consider row A(k,:) solely, and choose the index $k_y^{max}$ that corresponds to the maximum entry $$A_{k,k_y^{max}},$$

2) power-zone $k_y^{max}$ is reserved to RBM k and announced unavailable to all new comers (i.e., new RBMs), and
3) repeat the process for all new comers k'(k'≠k).

24. The method of claim 1, wherein the step of coordinated power-zone-assignment comprises incremental power-zone-assignment.

25. The method of claim 1, wherein the step of power-zone-assignment comprises an exhaustive search on a per-hub basis, comprising searching over the K! assignment possibilities and choosing the assignment with the highest per-hub utility, for every hub, after mapping each RBM to one hub incrementally.

26. An apparatus in a wireless backhaul network comprising a plurality of N Hubs, each Hub serving a plurality of K Remote Backhaul Modules (RBMs), said apparatus comprising a processor and a non-transitory computer readable storage medium storing instructions, for execution by the processor, for implementing the method steps of claim 1.

27. A non-transitory computer readable storage medium storing instructions for execution in a processor of a wireless backhaul network, for performing the method steps of claim 1.

28. A system in a wireless backhaul network comprising a plurality of N Hubs, each Hub serving a plurality of K Remote Backhaul Modules (RBMs), and comprising a network processor and a non-transitory computer readable storage medium storing instructions, for execution by the network processor for implementing the method steps of claim 1.

* * * * *